July 4, 1939.　　B. A. SWENNES　　2,164,551
HYDRAULIC BRAKE
Filed Aug. 24, 1936　　4 Sheets-Sheet 3
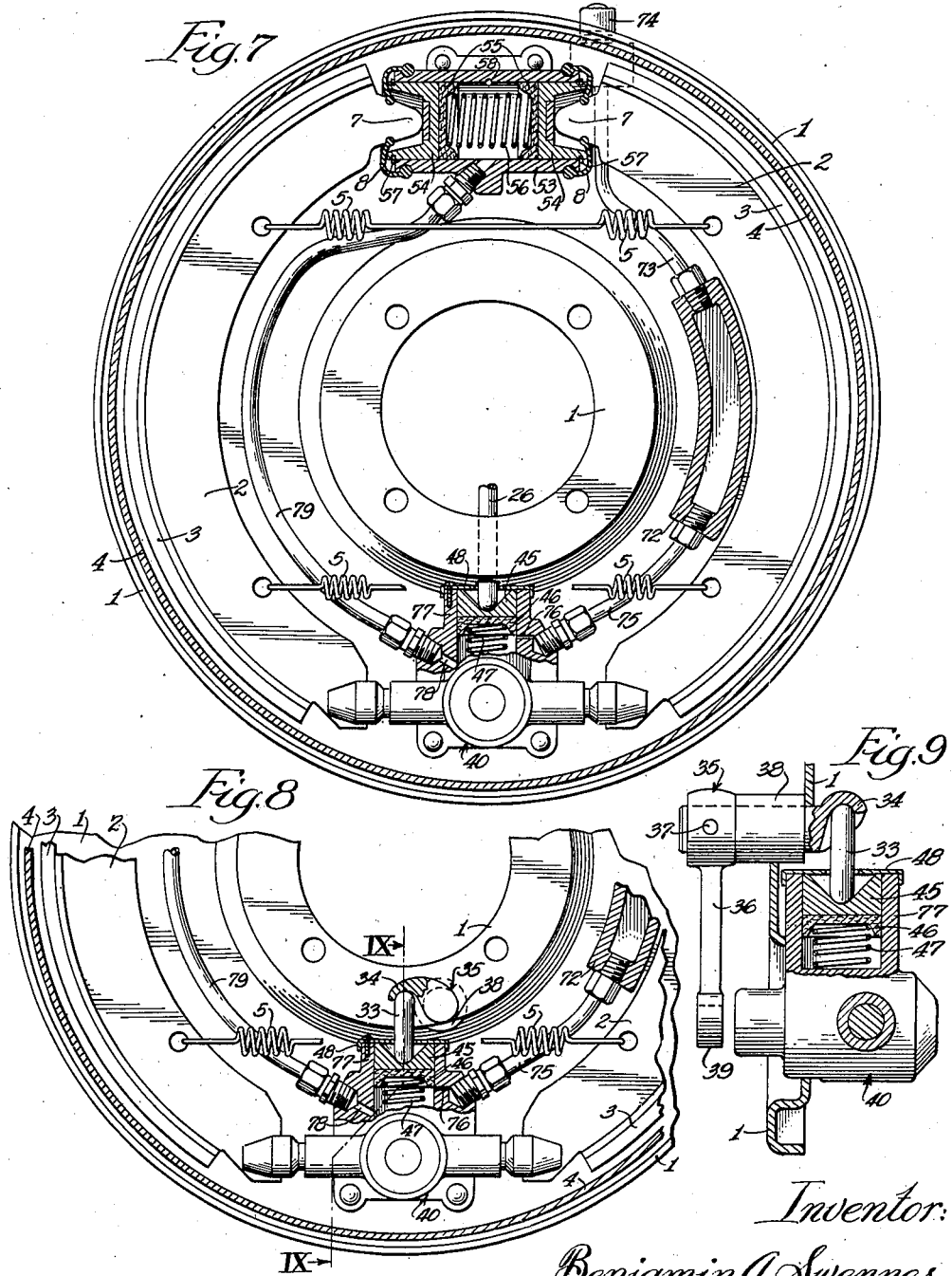

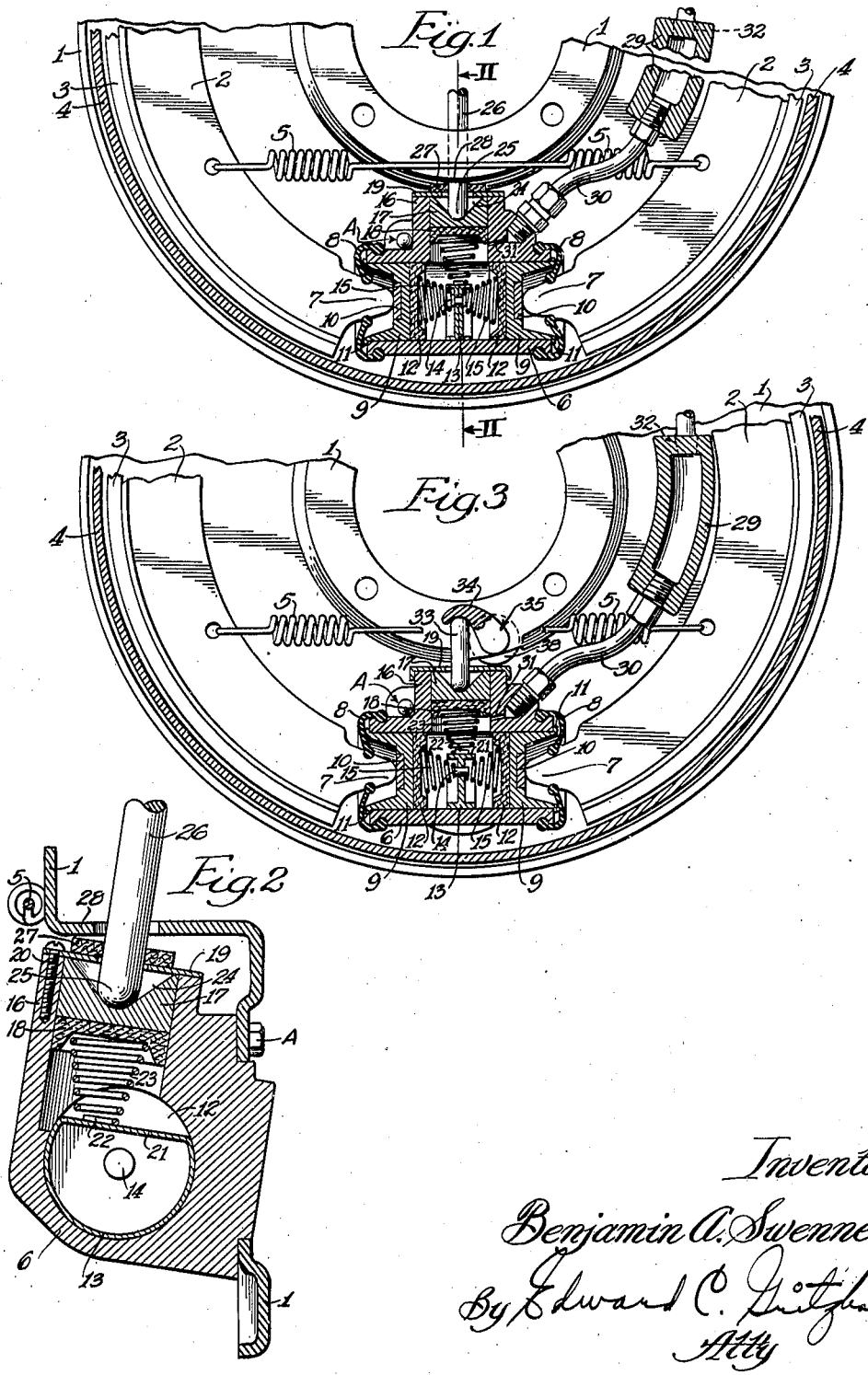

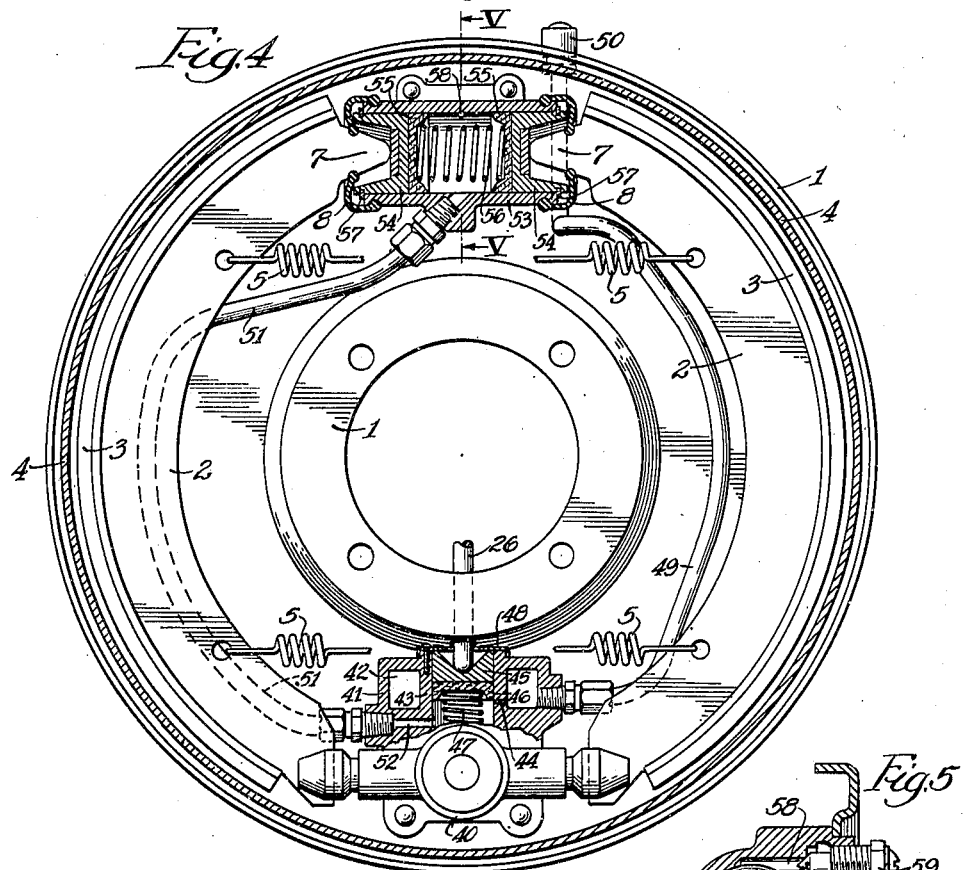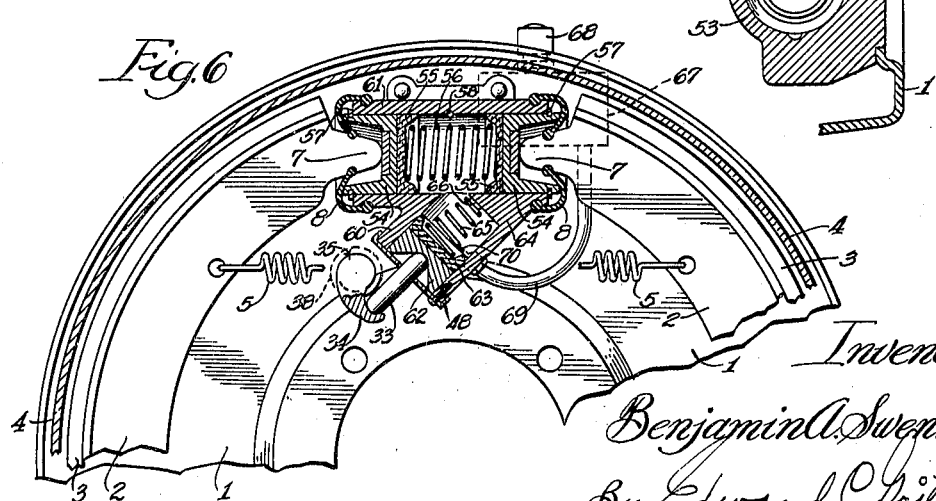

July 4, 1939.  B. A. SWENNES  2,164,551
HYDRAULIC BRAKE
Filed Aug. 24, 1936  4 Sheets-Sheet 4
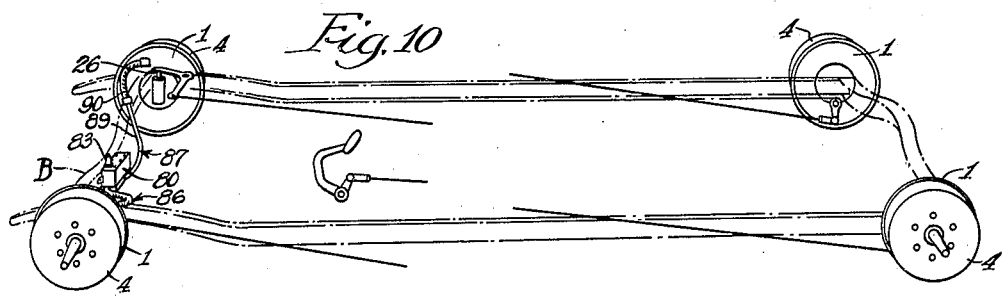
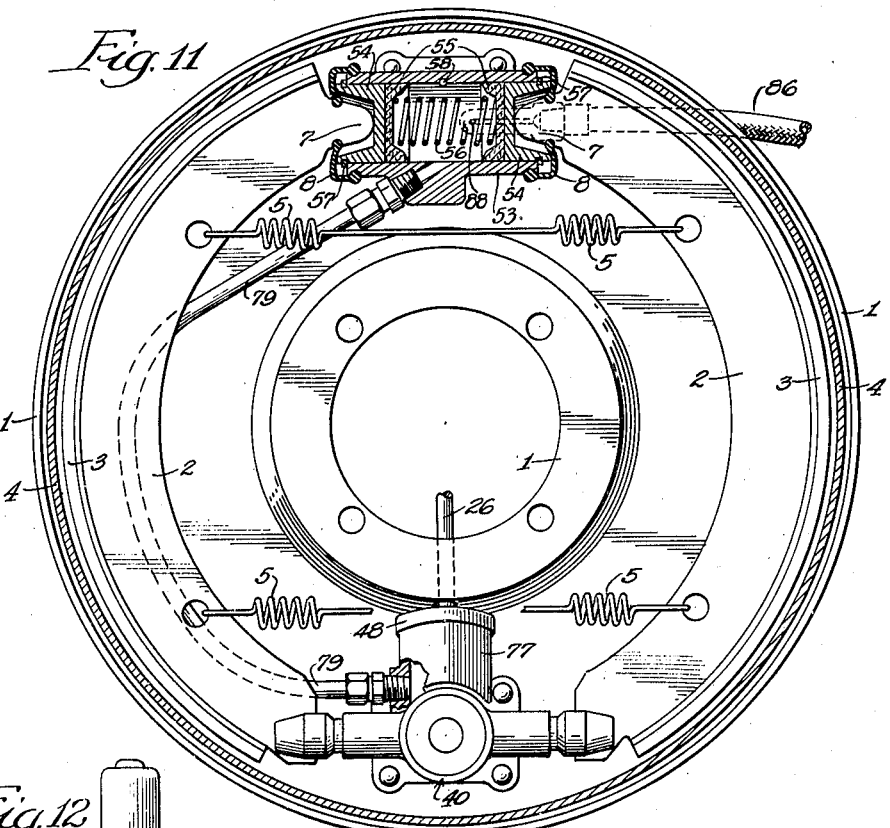
Inventor:
Benjamin A. Swennes,
By Edward C. Fitzbaugh
Atty Patented July 4, 1939

2,164,551

UNITED STATES PATENT OFFICE 2,164,551

HYDRAULIC BRAKE

Benjamin A. Swennes, Rockford, Ill., assignor to Borg-Warner Corporation, Chicago, Ill., a corporation of Illinois Application August 24, 1936, Serial No. 97,542

6 Claims. (Cl. 188—152)

This invention relates to brakes for motor and other vehicles.

It is an object of the invention to provide brake control mechanism affording transmission of brake applying pressure by mechanical and hydraulic means.

It is another object of the invention to provide a brake control system affording independent hydraulic pressure applying means for each wheel.

It is also an object of the invention to provide brake operating construction wherein the movable brake means for each wheel is movable by an individual complete hydraulic system receiving its actuating pressure from a brake rod or other actuating means.

It is also an object of the invention to provide hydraulic brake shoe spreading means individually to each wheel, and of such character as to replace mechanical spreading mechanism without substantial reorganization of conventional brake linkage.

A further object of the invention resides in the provision of a simplified hydraulic brake operating construction involving a minimum of parts and in the form of a unit complete with the brake shoe mounting plate.

It is also an object of the invention to provide a common reservoir or reserve chamber for the fluid systems for two or more wheels.

In accordance with the general features of the invention, each brake shoe unit is equipped with a hydraulic shoe-moving means comprising shoe-actuating pistons in a cylinder communicating with a reservoir which may supply the one, or more than one, unit. A master cylinder has a piston actuated from a brake rod, the pressure due to this actuation being communicated to the shoe-moving piston means hydraulically. Means is provided for preventing the shoe-return pressure from being communicated to the fluid, so that when the brake is inactive the piston packing is not under pressure and is therefore long lived. The hydraulic system is so constructed and arranged that the linkage and/or cam mechanism of mechanically moved brake shoes may be replaced by the relatively simple construction of the invention without reorganization of the actuating mechanism. The parts are at all times lubricated and friction is minimized.

Further objects and advantages of the invention will appear as the description proceeds.

The invention is illustrated in the accompanying drawings and hereinafter more fully described.

Fig. 1 is a fragmentary view, partly in section and partly in elevation, showing details of one form of the invention applied to the front wheel of an automobile.

Fig. 2 is an enlarged view taken substantially as indicated by the line II—II in Fig. 1.

Fig. 3 is a view similar to Fig. 1 but showing the construction applied to the rear wheel of an automobile.

Fig. 4 is a view similar to Fig. 1 but of a modified construction.

Fig. 5 shows the bleeder and control therefor, taken as indicated by the line V—V in Fig. 4.

Fig. 6 is a view similar to Fig. 3, but of a modified construction.

Fig. 7 is a view similar to Fig. 4 but showing another form of the invention.

Fig. 8 is a view similar to Fig. 7 but showing the construction applied to a rear wheel.

Fig. 9 is a view partly in section and partly in elevation, taken as indicated by the line IX—IX in Fig. 8.

Fig. 10 is a diagrammatic view showing another feature of the invention, embodying a common fluid reservoir for the front wheel fluid pressure systems.

Fig. 11 shows details of one of the brakes of Fig. 10.

Fig. 12 is a section-elevation showing details of the reservoir of Fig. 10.

In the form of the invention shown in Figs. 1 and 2, there is illustrated a support in the form of a mounting or backing plate 1 equipped with brake shoes 2, the pivotally mounted heels of which are not shown but may be of any conventional or other suitable design such as is shown in my co-pending application Serial No. 97,934, now Patent No. 2,107,092, issued February 1, 1938. Each shoe 2 carries brake-lining 3 adapted for braking engagement with the inner surface of a brake drum flange 4 or other brake surface associated with a front wheel of a vehicle such as an automobile. The shoes 2 are urged into non-braking positions by any suitable means such as the return spring means 5.

In this form of the invention, a wheel cylinder 6 is located between the shoe toes 7 and is provided at each end with a resilient rubber or other suitably flexible boot 8 having dust-proof connection with the cylinder and the adjacent toe 7. Disposed within the cylinder 6 for contact with the toes are opposed pistons 9, each having a toe-engaging member or plate 10 and formed at 11 to limit the movement thereof inwardly of the cylinder. The return spring 5 maintains this engagement. Attached to the piston is a packing cup 12 which acts as a seal to maintain pressure and prevent loss of brake fluid. A stationary double sleeve 13 which may be fixed within the cylinder as by a press fit is located substantially midway of the length of the cylinder 6 and is provided in its web with a guiding pin 14 adapted to fit within the reduced ends of conical spiral springs 15, the larger ends of which are received in the packing cups 12.

The cylinder 6 may form the head or crossbar of a T, the stem 16 of which extends upwardly from and in communication with the cylinder 6 as shown. The stem 16 is in the form of substantially a hollow cylinder in which a piston 17 carrying a packing cup 18 of leather or other suitable material is slidable, the piston being limited in its outward or return movement by a plate 19 secured at 20 to the end of the cylinder 16. The sleeve 13 has a preferably flattened upper portion as at 21 and is provided with a projection 22 adapted to fit in the small end of a frusto-conical spiral spring 23, the other end of which is received in the cup 18. The piston 17 is provided with a socket 24 to receive the ball end 25 of an actuating member 26 which may be a standard push rod such as will be found on present day cars. A dust guard 27 engageable with the outer face of the plate 19 and snugly receiving the rod 26 is provided. The rod 26 extends upwardly and inwardly through an opening in the transverse wall portion 28 of the mounting plate 1 and may extend thru the king-pin.

The cylinder structure may be cast or stamped or formed in any other suitable manner, and is suitably bolted, riveted or otherwise secured to the mounting plate as indicated at A.

Also carried by the mounting plate 1 is a reserve chamber or reservoir 29 containing the fluid supply for the cylinders 6 and 16. Communication between the reservoir and the cylinder structure is afforded by a tube 30 connected to the cylindrical structure, and a port 31 in the cylinder 16. The chamber 29 is provided with a suitable air vent and filler cap shown in part at 32 and more completely in other views.

Upon depression of the brake lever, for example, the push rod 26 is thrust in a downward direction as seen in Figs. 1 and 2, forcing the piston 17 downwardly against the packing cup return spring 23 past the port 31, causing enclosed liquid to force the pistons 9 outwardly. The initial movement of the piston 17 results in closing the port 31 and thereafter the taking up of the clearance between the shoes 2 and the brake drum 4. Then, the downward thrust of the push rod 26 is communicated to the pistons 9 and the trapped liquid, so that said pistons 9 operate upon the toes 7 of the shoes 2 to force the shoes into tight braking engagement with the drum 4. The port 31 allows any surplus liquid due to expansion to escape into the supply chamber, and enables additional liquid to enter the cylinders should there be an insufficiency of liquid due to contraction or other causes.

When the brake pedal or other operating instrumentality and the push rod 26 are released, the spring 5 acts to return the shoes 2 to the released positions shown, forcing the pistons 9 inward, compressing the springs 15 and forcing the piston 17 to the upper or "off" position in the master cylinder 16 as shown.

Fig. 3 shows a construction almost identical with that shown in Figs. 1 and 2, except that the invention is applied to a rear wheel. Accordingly, like parts are like numbered. In this form for the rear wheels, a force transmitting pin or plunger 33 has a ball and socket connection with the master cylinder piston 17 and likewise with the bell crank 34 of a bell crank lever 35 as also shown in Fig. 9 in connection with another form of the invention. The lever comprises a second crank 36 secured at 37 to the crank 34 to turn in unison therewith. The bell crank lever is extended through a bushing 38 welded or otherwise suitably secured to the mounting or backing plate 1. The free end 39 of the arm 36 is adapted to be, and in service is, connected to a rear brake rod (not shown) of standard or any other suitable construction. The arrangement is such that when the operator moves a brake lever to operate the brake or the braking force is initiated in any other manner, the bell crank lever is rotated by the brake rod or other instrumentality, causing the arm 34 to move the plunger 33 downward, thereby operating the brake substantially in the same manner as explained in connection with the form of the invention shown in Figs. 1 and 2. Upon release of the brake pressure, the parts are returned to the positions shown.

A modified form of the invention applied to a front wheel is shown in Fig. 4. In this form, there is additionally shown the heel portions of the shoes 2, and the adjusting mechanism indicated generally at 40, of any suitable character, the details of which do not concern us here. Fixedly secured to or integrally united with the housing for the adjusting mechanism 40 is another housing 41 providing a reservoir 42 for the brake operating liquid, said reservoir surrounding a master cylinder 43 and communicating therewith thru the port 44. Slidable within the cylinder 43 is a master piston 45 and associated packing cup 46 between which and an abutment on the casing is a compression spring 47 constantly urging the piston to "off" position. A dust guard and stop 48 is secured to the cylinder. A push rod 26 similar to the push rod 26 previously described, passes through the backing plate and dust shield and has substantially a ball and socket engagement with the piston 45. A reservoir supply tube 49 affords communication between the reservoir 42 and an air vent and filler cap 50.

A tube 51 communicating with the interior of the cylinder 43 by means of the passage 52 leads to the interior of the wheel cylinder 53 in which are opposed pistons 54 provided with packing cups 55 between which a compression spring 56 is positioned. The pistons 54 carry bearing plates engageable with the toes 7 as described above. Split rings 57 applied to the outer portions of the pistons 54 provide abutments engageable with the ends of the wheel cylinder 53 to limit the inward movement of the pistons, thus having a function like that of the enlargements at the ends of the pistons previously described. By virtue of this construction, the liquid is not subjected to pressure in response to the pull of the return spring 5 on the toes 7, so that when the master piston 45 is in the "off" position shown, the cups are substantially relieved of pressure and are accordingly able to stand up for a considerably longer period than would otherwise be true.

A bleeder hole 58 formed in the upper part of the cylinder 53 affords escape of any air which may be trapped in the cylinder, a screw 59 being provided to control the bleeder opening for this purpose, as shown in Fig. 5.

A boot 8 cooperates with the cylinder ends and the toes 7 in a manner described in connection with another form of the invention.

The operation of this construction will be understood from the explanation given in connection with Figs. 1 and 2. The departure of Fig. 4 from that previously described form resides in the modified reservoir and brake shoe arrangement and in the separation of the wheel cylinder from the master cylinder.

Fig. 6 shows a modification of Fig. 3. The structure in Fig. 6, as in Fig. 3, is applied to the rear wheel, but is arranged at the top of the mounting plate rather than at the bottom as shown in Fig. 3.

In this modified construction, the master cylinder 60 is arranged for convenience at an acute angle to the wheel cylinder 61, altho it will be understood that the angle could be varied as desired without departing from the principles of the invention. The master cylinder 60 carries a piston 62 provided with a packing cup 63 between which and an abutment 64 there is provided a conical spring 65 the smaller end of which receives a button 66 to prevent shift of the spring. The cylinder 60 has a dust cap 48 through which extends a master piston actuating element or push pin 33 having a universal connection therewith and with the arm 34 of the bell crank lever 35 connected to a brake rod or the like as described previously.

A reservoir 67 provided with an air vent and filler cap 68 communicates with the interior of the master cylinder 60 by means of a tube 69 and port 70.

The remainder of the structure is similar to the corresponding structure of Fig. 4 and is accordingly like numbered.

The form of the invention appearing in Fig. 7, for a front wheel, for example, differs from that shown in Fig. 4 substantially only in the modification of the reservoir. Instead of forming the reservoir wall substantially as a part of the unit including the master cylinder and the adjusting device 40, the reservoir in Fig. 7 is a separate chamber 72 communicating by means of the tube 73 with the air vent and filler cap 74 and by means of the tube 75 and port 76 with the interior of the master cylinder 77. By means of a passage 78 in the cylinder 77 and a tube 79 communication is established between the master cylinder 77 and the wheel cylinder 53. The remaining structure is substantially identical with that shown in Fig. 4 and is accordingly similarly numbered.

Fig. 8 shows the structure of Fig. 7 modified only to the extent necessary to adapt the same to a rear wheel.

It will be appreciated that, if desired, instead of providing an individual reservoir for each brake, a reserve chamber could be provided affording liquid for both of the front brakes, or both of the rear brakes, or all of the front and rear brakes. For purposes of illustration, however, there is shown in Fig. 10 in perspective and diagrammatic form, an assembly in which the rear wheel brakes may be mechanically actuated, while the front brakes are of the liquid actuated type such as any of those heretofore described, but modified to the extent that a single reserve chamber is provided for cooperation with both front brakes. This chamber, designated by the numeral 80, is provided with a main compartment 81 and lugs 82 through which bolts or other suitable securing means may extend to mount the chamber on the frame or other suitable stationary part B of the vehicle. The chamber is provided with an air vent closure and filler cap 83, and with a compression check valve 84 spring pressed into an open position to allow liquid to be drawn from the chamber for use in connection with the individual brakes, but adapted to be closed automatically by the pressure of the liquid upon operation of the brakes.

The housing 80 accordingly provides a secondary chamber 85 between which and the main chamber 81 the valve 84 is located. The secondary chamber, thru tubular connections 86 and 87, communicates with the brake operating wheel cylinders of the respective wheels, each of said cylinders being provided with a port 88 for this purpose. The housing 80 is preferably disposed adjacent one of the wheels, and its tubular connection with the brake operating cylinder of that wheel may be effected by a hose. The correspondingly distant wheel cylinder may be placed in communication with the housing 80 by a copper or other preferably metallic tubing 89 extending to a point short of such cylinder, and thence by hose as shown at 90.

It will be observed that except for the location of the reserve chamber or reservoir, Figs. 7 and 11 are substantially identical. Accordingly like parts are like numbered.

From the above it is apparent that with this invention hydraulic brake actuation is individual for each brake, with resultant reduction in attention required by and wear inherent in mechanical actuating mechanisms, and, employing an oily liquid, with the elimination of lubrication which mechanical mechanisms require. Other advantages well known in the employment of hydraulic brake actuating mechanism are also obtained with constructions embodying the present invention.

In a conventional car, the front wheel and brake drum may be mounted to rotate on the axle shaft, connected to the front axle by a king-pin, and the mounting plate fastened to the axle shaft, the wheel, drum and mounting plate being thereby pivotally connected as a unit to the axle by the king-pin.

In a rear wheel installation, the mounting plate may be connected to the rear axle housing or other similarly stationary structure.

I am aware that many changes may be made and numerous details of construction may be varied through a wide range without departing from the principles of this invention, and I therefore do not purpose limiting the patent granted hereon otherwise than by the scope of the appended claims.

I claim as my invention:

1. In a vehicle, the combination with a brake surface, supporting means, brake means mounted thereon and engageable with said surface, and means for operating said brake means, of a fluid pressure system mounted on said supporting means and including a master cylinder having a driving piston arranged to be moved by said operating means and a cylinder mounted independently of and communicating with the master cylinder and having a driven piston for actuating said brake means, said driven piston being movable by the fluid in response to movement of said driving piston.

2. The combination with a brake surface, supporting means, brake means mounted thereon and engageable with said surface and means for operating said brake means, of a hydraulic pressure unit mounted on said supporting means and controlled by said operating means for actuating said brake means, said unit comprising a cylinder containing liquid, a reservoir therefor, spaced pistons in said cylinder for moving the brake means, a master cylinder branching from the first cylinder, and a master piston in the master cylinder and movable by said operating means to cause the liquid to move said spaced pistons and thereby actuate said brake means.

3. The combination with a brake surface, supporting means, brake means mounted thereon and engageable with said surface and means for operating said brake means, of a hydraulic pressure unit mounted on said supporting means and controlled by said operating means for actuating said brake means, said unit comprising a cylinder containing liquid, a reservoir therefor, spaced pistons in the cylinder for moving the brake means, a master cylinder branching from the first cylinder and forming a wall of said reservoir, and a master piston in the master cylinder and movable by said operating means to cause the liquid to move said spaced pistons and thereby actuate said brake means.

4. In a vehicle brake of the type wherein a brake drum is provided, having its open end closed by a circular disc about which it is adapted to rotate and being further provided with a pair of arcuate brake shoe means positioned for braking engagement with the inner periphery of said drum; the arrangement being particularly characterized by the provision of means for actuating said brake shoe means, said actuating means comprising a cylinder fixedly supported with respect to said disc, a pair of pistons operable within said cylinder, each operatively engaging one end of each of said arcuate brake shoe means for operating the same, a master cylinder mounted on said disc and in fluid communication with said first named cylinder intermediate the adjacent faces of said pair of pistons, a master piston in said master cylinder, a fluid reservoir in communication with said master cylinder for supplying fluid thereto, and means for actuating said master piston to effect the operation of said brake operating pistons through the medium of said fluid connection.

5. The structure as defined in claim 4 wherein said first named cylinder and said master cylinder are each confined within the space defined by said drum and said disc and in fixed relation with respect to said disc.

6. The structure as defined in claim 4 wherein said master cylinder is provided with an inlet port communicating with said reservoir, said port being uncovered by said master piston when in its near retracted position and being covered by said master piston during the major portion of the movement of said master piston in driving said brake operating pistons through said fluid link.

BENJAMIN A. SWENNES.